United States Patent Office 3,502,373
Patented Mar. 24, 1970

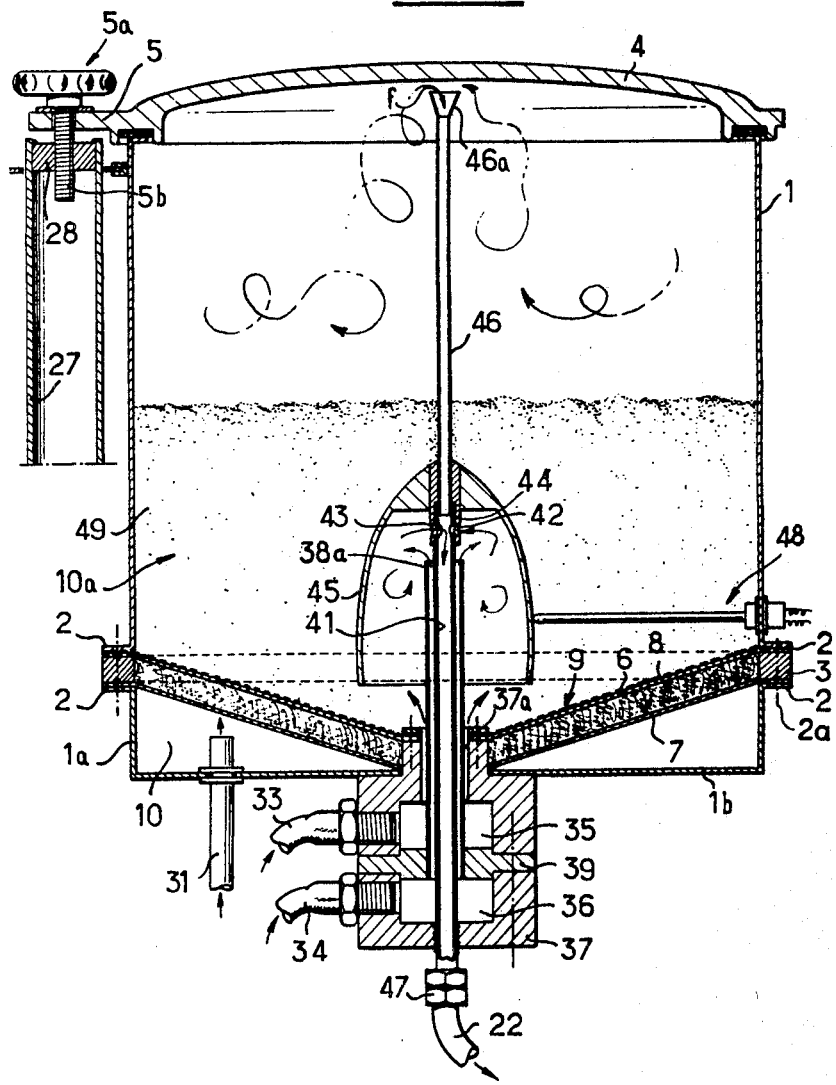

3,502,373
MEASURING APPARATUS FOR DISPENSING
PULVERULENT MATERIALS
Andre Janot, 3 Avenue de l'Association,
Colombes, Hauts-de-Seine, France
Filed May 10, 1968, Ser. No. 728,248
Claims priority, application France, May 12, 1967,
106,390
Int. Cl. B65g 53/04, 53/40
U.S. Cl. 302—17    2 Claims

ABSTRACT OF THE DISCLOSURE

Measuring apparatus for dispensing pulverulent materials, comprising, housed in a casing, a tight removable container divided by a frusto-conical filtering sieve into two superimposed compartments. The upper compartment receives the material to be measured and it contains a member in the shape of a bell associated with a central pipe leading to the place of utilization of the measured material. An air distributing block is connected to a blower which forces the pressurized air under and into the aforementioned bell member.

---

The present invention has for its object an apparatus whereby a pulverulent material can be measured in a continuous manner and adjusted at will while said pulverulent material is at the same time propelled to the place of its utilization.

Said apparatus is more particularly adapted to measure and propel to the burner flame in a central heating boiler or the like a pulverulent material such as magnesia whereby to eliminate the corrosive effect of the sulphur vapors contained in the combustible of said boiler.

Such an apparatus is essentially characterized in that it comprises a tight removable container which is mounted inside a suitable housing and at the lower part of which is accommodated a frusto-conical filtering sieve dividing said container into two superimposed compartments. The upper compartment is adapted to receive the pulverulent material while the lower compartment is connected to the discharge side of a blower which feeds, moreover, an air distributing block having independent chambers and fixed under the bottom of the container. Said block is provided with a device insuring the admission of air under pressure into said chambers and into two nozzles associated therewith of which one opens under, and the other into, a bell-shaped member housed in said container, whereby to direct a quantity of the pulverulent material into said bell member. This material is forced through ports forming atomizers in a central pipe of which an end opens into the upper part of the container, under the lid thereof, where is forced the air having passed through the filtering sieve and the pulverulent material, while the other end thereof is connected by the instrumentality of a swivelling union to a piping leading to the place of utilization.

So that the object of my invention may be better understood, there will be now described in an illustrative and by no means limitative manner an embodiment according to this invention and as represented in the annexed drawings, in which:

FIG. 4 is a vertical sectional view of the measuring container;

Figure 1:
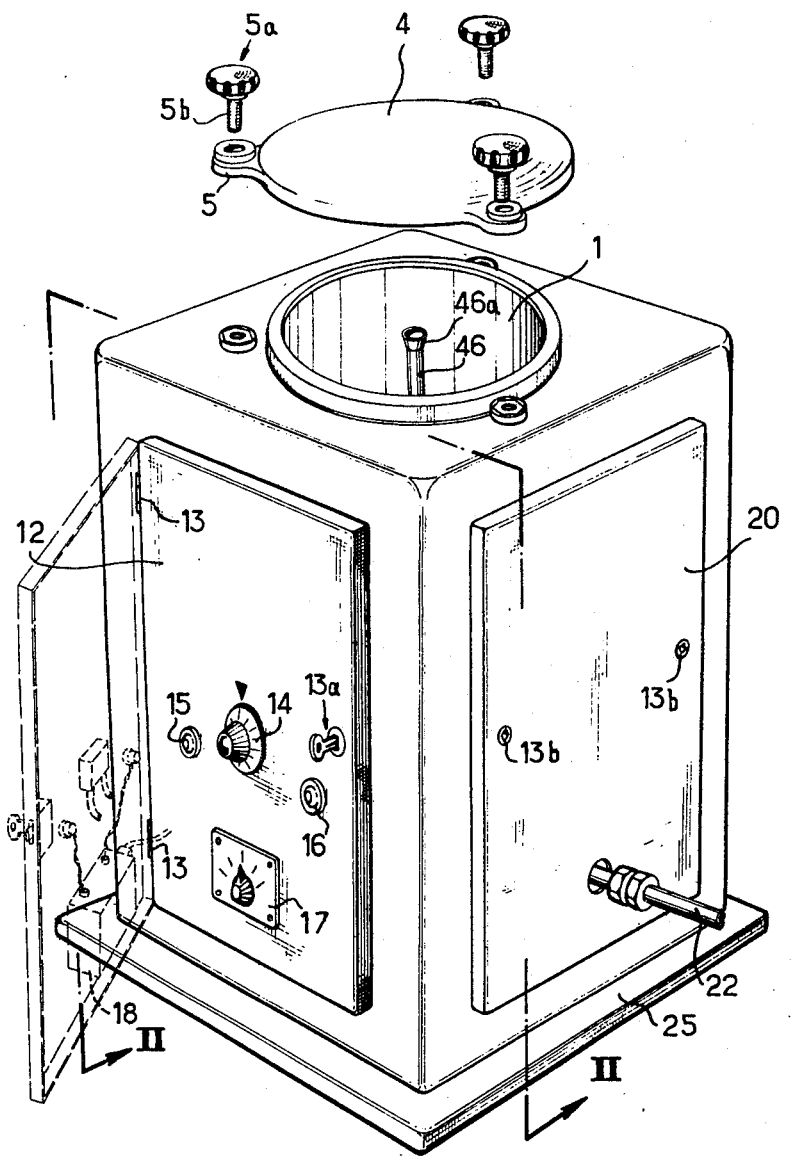
FIG. 1 is a diagrammatic perspective view of the apparatus.

Referring now to the drawings, the measuring apparatus dispensing pulverulent materials according to the present invention comprises a cylindrical container formed by two parts 1 and 1a having each a flange 2 at the lower end thereof. These flange members 2 are used to connect said parts 1, 1a, with a ring or crown 3 having a square cross-section and made, e.g. of steel, previously interposed therebetween. Said container is closed at the upper part thereof by a lid 4 provided with clamping members comprising, for example, buttons or hand-wheels 5a integral with externally threaded rods 5b which extend through lugs 5 formed in said lid member. The lower part of said container contains a removable sieve member constituted by two frusto-conical perforated sheet metals 6 and 7 between which a filtering mass is confined, made, for example, from sponge rubber or other equivalent material. Preferably, the apex angle included between the frusto-conical perforated sheet metals 6 and 7 is equal to 150°, and the perforations of said sheet metals have a diameter of 0.9 mm., there being eleven perforations in each square centimetre of the sheet metals.

The sheet metal 6 is covered with a very fine sieve 9, preferably made from the synthetic material denoted nylon.

The elements 9, 6, 8 and 7 have the external edges thereof pressed between flanges 2 and ring 3, the whole being clamped by means of bolts 2a. Thus, this arrangement defines two independent enclosures 10 and 10a. The enclosure 10 is located under the aforementioned sieve. The enclosure 10a is adapted to accommodate the pulverulent material 49, for example magnesia, which is to be measured and conveyed in a continuous manner under pressure to a utilization place, such as the burner of a heating boiler, whereby to eliminate the corrosion thereof by the sulphur vapors emanated from the combustible.

The bottom 1b of the part or element 1a has a central opening which accommodates therein the end 37a forming a nozzle of an air distributing block 37 described below. On said nozzle 37a is centered the frusto-conical suitably perforated end of the elements 9, 6, 8 and 7 described above.

Two chambers 35 and 36 formed in the air distributing block are separated by a partition member 39. The lower end of nozzle 37a opens into chamber 35 and the upper end thereof opens into said enclosure 10a.

Two tubular coaxial pipings 38 and 41 (FIG. 4) are housed in said nozzle 37a with a slight annular clearance. After having passed through the partition 39, piping 38 opens into the chamber of the recited block 37. Piping 41 extends through the bottom of the block 37 and is ended with a swivelling union 47 to which is connected a pipe 22 leading to the apparatus which is to be fed with the pulverulent material.

The upper end of pipe 41 ends to a point located at about ⅓ of the height of enclosure 10a.

In the vicinity of the upper end of pipe 41 are drilled two diametrically disposed calibrated orifices 42 and 43 constituting a kind of atomizer. Said atomizer is protected by an insulating sleeve 44 having orifices therein corresponding to the orifices 42 and 43 in pipe 41.

A pressure reducing tube 46 is engaged and fixed in the end of said pipe 41, the upper extremity of said tube 46 ending at a few millimetres of the lid member 4 and having an upper outwardly flaring inlet 46a.

A bell member in the form of a revolution paraboloid is mounted on the pressure reducing tube 46 above the atomizer, so that the lower edge thereof is located at a few centimetres of the filtering sieve 9.

The device so realized is housed in a casing 11 having preferably a square cross section with rounded edges.

Four interchangeable panels are mounted on the faces of said casing. The panel 12, which is mounted by door hinges 13 on the forward face of this casing, is provided with a lock 13*a* and operates as a door. On the external face of said door is mounted an adjusting button 14, two lighting signals 15 and 16 which are associated to a sound indicator if desired, and an electric contactor 17. Adjusting electric members 18 are mounted on the internal face of the recited casing.

Figure 2:
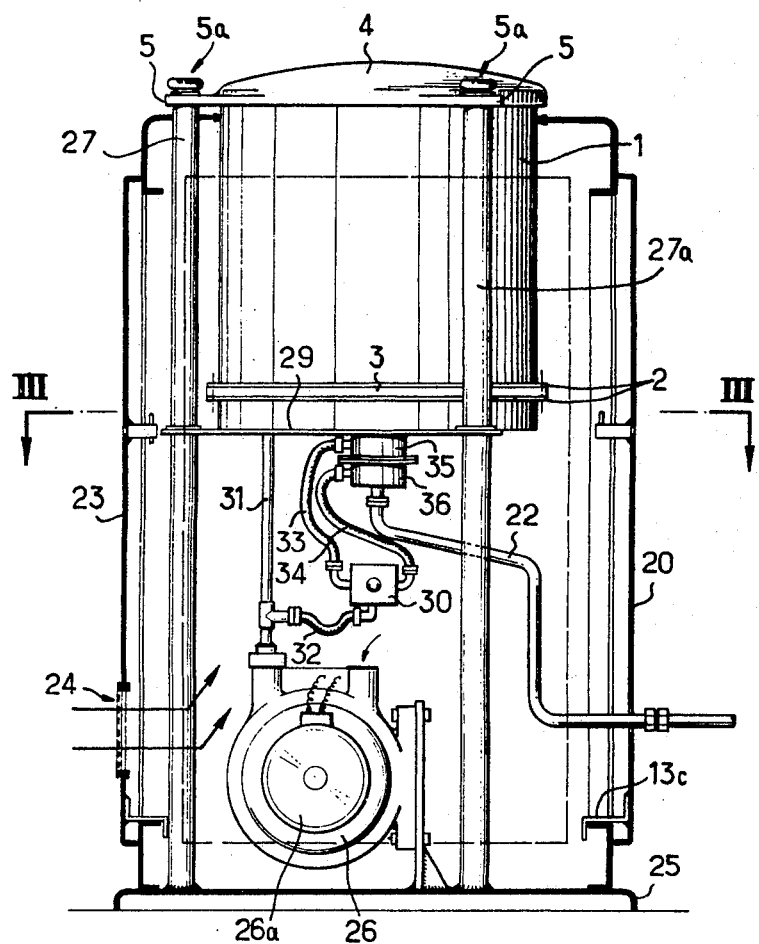
FIG. 2 is a sectional view made along the line II—II in FIG. 1.
Figure 3:
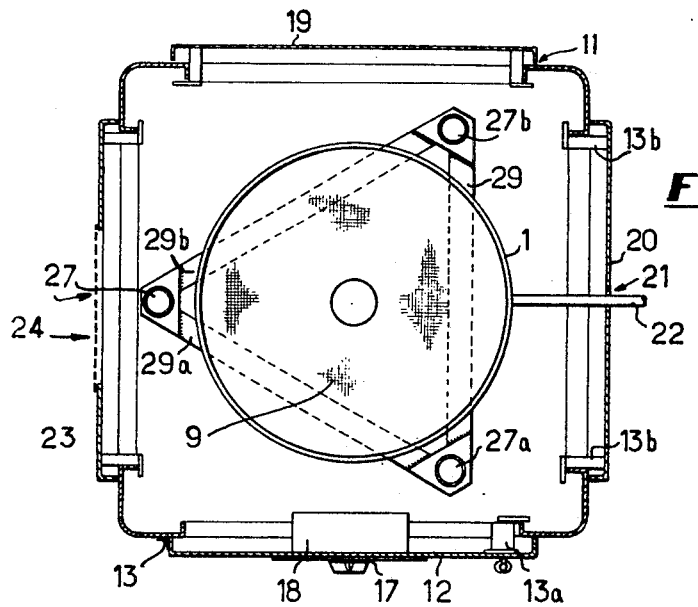
FIG. 3 is a sectional view made along the line III—III in FIG. 2.

The three other panels can be removed by means of locks 13*b* cooperating with connecting lugs 13*c* (FIG. 2). The panel 19 is a solid one. The panel 20 has an orifice 21 through which extends the outlet pipe 22. The panel 23 has an aperture provided with a filter member 24. Since said three panels are identical and removable, the outlet face of the pipe 22 may be chosen at will.

A blower motor 26*a* and a blower 26 operated thereby are mounted on the base 25 of the casing 11. Three tubes 27, 27*a* and 27*b* are welded to said base and are connected one to the other by cross-pieces 29, 29*a* and 29*b* assembled according to a triangular pattern. Said tubes carry welded nuts 28 accommodating the externally threaded rods of the clamping button members 5*a*.

A cock 30 having three calibrated ways is mounted between the blower 26 and the part 1*a* of the container and it allows to adjust the distribute the air in the container, i.e. in the enclosures 10 and 10*a* separated by the filtering assembly 9, 6, 8 and 7. Cock 30 is connected to the discharge tube 31 of the blower 26 by means of a hose 32. The two outlet orifices 33 and 34 are connected in the same manner to the chambers 35 and 36 of the block 37. The tube 31 opens directly into the enclosure 10 under the abovementioned filtering sieve.

A probe 48 (FIG. 5) cooperating with the bell member is adapted to indicate the level of the material 49 in enclosure 10*a*.

The apparatus according to the present invention operates as follows.

Figure 5:
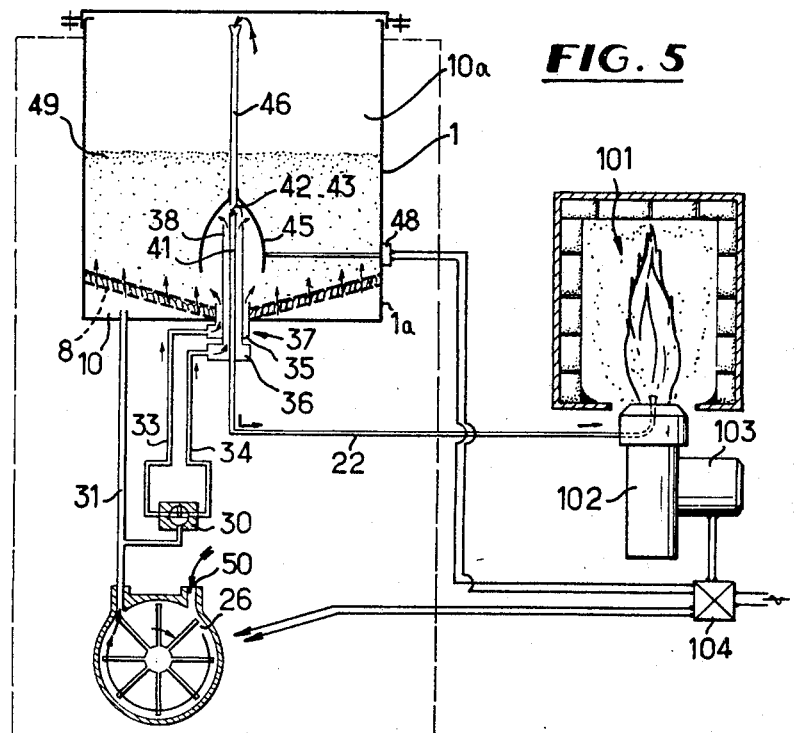
FIG. 5 is a diagrammatic view showing how the apparatus according to this invention is incorporated in a heating circuit. .

Assuming that said apparatus is installed as shown in FIG. 5 in the vicinity of a plant comprising a heating chamber 101, a burner 102, a motor 103 and a starting device 104, and that the enclosure 10*a* is filled with pulverulent magnesia 49, as soon as burner 102 is lighted, the recited contactor causing the blower 26 to operate, the ambient air is drawn by said blower through an inlet orifice 50 and is discharged under pressure into the tube 31. A part of said air is led directly into the enclosure 10 under the filtering assembly 9, 6, 8 and 7, while the other part of said air circulates through cock 30 and feeds the chambers 35 and 36 with a flow rate that one can adjust by means of the button 14. The air discharged into the lower enclosure 10 passes through the filtering assembly and the mass of pulverulent material which is contained in the enclosure 10*a* disposed above said material. The air discharged by the nozzles 37*a* and 38*a* insures a constant density of the material suspended in the bell member 45. Said suspended material is forced through the orifices 42 and 43 of the atomizer by the air flow under pressure in the tube 41 and then in the pipe 22 connected to the burner 102 where said material produces its anticorrosive effect.

It is to be noted that the combination of the bell member 45 and the two air currents discharged from the lower nozzle 37*a* and the upper nozzle 38*a* and associated with the calibrated orifices 42 and 43 insure the adjustable and continuous measuring of the powder toward the outlet pipe 22, whatever may be the level of said powder in the apparatus.

What is claimed is:

1. In an apparatus for continuously and adjustably measuring a pulverulent material and at the same time propelling said material to the utilization place thereof, of the type comprising a tight container provided with a filtering sieve dividing said container into two superimposed compartments, the upper compartment containing the pulverulent material, while the lower compartment is connected to the discharge of a blower which feeds a pressurized-air distributing block having independent chambers, the combination according to which the air distributing block and a device in the form of a slide-valve allow to adjust at will the admission of said air under pressure into said chambers, and into two pipings associated therewith of which the first one opens under a bell, housed in the container, while the second piping opens into the interior of said bell where a quantity of said material is directed into said bell where it is forced through ports in a central pipe of which an extremity ends at the upper part of the container where is permanently forced the air having passed through the filtering sieve and the pulverulent material housed in the compartment located above said filtering sieve, said central pipe being connected by a swivelling union to a pipe leading to the utilization place.

2. Apparatus according to claim 1 characterized in that the adjustable and continuous measuring of the pulverulent material toward the orifice of the outlet pipe is insured, whatever may be the level of said powder in the container, by the combination of the bell and of two air currents from nozzles of the pipings associated to the calibrated orifices of the central pipe.

References Cited

UNITED STATES PATENTS

| | | | |
|---|---|---|---|
| 2,072,845 | 3/1937 | Benoit | 222—195 |
| 2,758,564 | 8/1956 | Randall | 302—53 |
| 3,093,420 | 6/1963 | Levene et al. | 302—53 |
| 3,179,378 | 4/1965 | Zenz et al. | 302—53 |

ANDRES H. NIELSEN, Primary Examiner

U.S. Cl. X.R.

302—36, 53